M. M. SMITH.
Boiler-Tube Cleaner.

No. 165,182. Patented July 6, 1875.

WITNESSES.
E. H. Johnson.
L. C. Tufts.

INVENTOR.
Minard M. Smith.
per J. A. Durgin. Atty

UNITED STATES PATENT OFFICE.

MINARD M. SMITH, OF NEW YORK, N. Y., ASSIGNOR OF ONE-HALF HIS RIGHT TO LEWIS C. TUFTS, OF SAME PLACE.

IMPROVEMENT IN BOILER-TUBE CLEANERS.

Specification forming part of Letters Patent No. 165,182, dated July 6, 1875; application filed May 17, 1875.

*To all whom it may concern:*

Be it known that I, M. M. SMITH, of New York city, N. Y., have invented certain Improvements in Boiler-Tube Cleaners, of which the following is a specification:

My invention relates to devices for cleaning or scraping the interior of boiler or other tubes; and consists in a novel construction, combination, and arrangement of parts, which have for their object to improve the operation of the same and facilitate their manipulation, as will be fully hereafter described.

Figure 1:
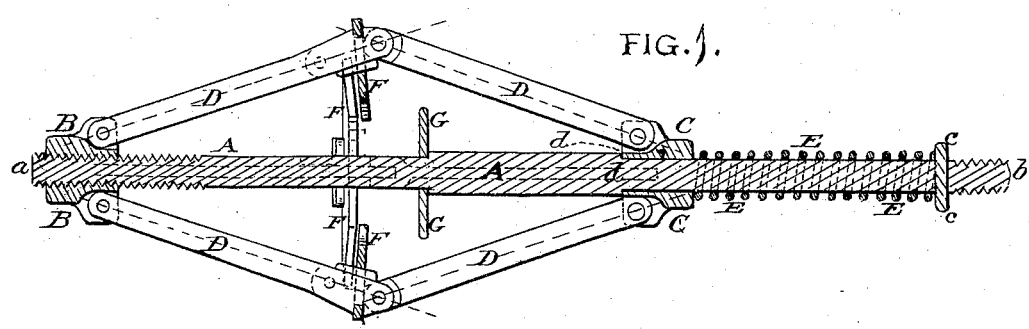
Figure 2:
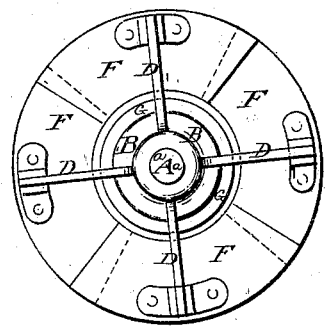

Figure 1 is a longitudinal section, and Fig. 2 an end view, of my improved tube-cleaner.

A represents a rod or spindle, which is screw-threaded at both extremities, $a$ and $b$. B is a nut working on the screw end $a$ of the spindle, and C is a collar sliding on the spindle. This nut and collar are formed as shown in the drawings, and are connected together by a series of toggle-joints, D, the extremities of which are pin-jointed in the nut B and collar C, and thus connect this nut and collar. E is a helical spring encircling the spindle, and confined between the collar C and a pin, $c$, passing through the spindle; and thus it exerts a pressure on the collar, and thereby tends to keep it against the shoulder $d$, formed by the greater diameter of the spindle at this point. F F are the scraping-segments, which are secured to the arms of the toggle-joints. G is a disk secured on the spindle, to act as a stop for the arms when the scraper is contracted to its smallest diameter.

To readily arrive at a thorough understanding of the principle of the operation of the devices before described, let it be supposed that the collar was swiveled on the spindle A, so as to be capable of turning but not of sliding thereon; then, on turning the spindle, the screw-nut B would travel along the screw end $a$ of the spindle and move toward or from the collar C, and the toggle-joints would be expanded or contracted; but, both the nut B and collar C being immovable as regards a longitudinal movement, the arms D would be rigid as regards contraction or expansion, and could not be pressed in; nor would the scrapers press against the interior of the tube in operation. Therefore, to render the joints flexible, the collar C is made capable of sliding on the rod or spindle A, and is kept against the shoulder $c$ by the spring E, so that, as the toggles are pressed inwardly, the spring yields, and on the pressure being removed they are thrown out again by the spring; and it will be further seen that, by turning the spindle so as to run the nut toward the collar, the toggles will be expanded to fit the scrapers to larger bores of tubes or to smaller bores, but with a greater degree of pressure.

It will be evident to any skillful mechanic that my invention may be modified in various ways; and I, therefore, do not confine myself to the precise construction and arrangement herein shown and described.

What I claim is—

The combination of the spindle A, adjusting screw-nut B, working on the screw-threaded extremity $a$ of the spindle, collar C, toggle-joints D, provided with scrapers F, and helical spring E, constructed and operating substantially in the manner described and specified.

MINARD M. SMITH.

Witnesses:
E. H. JOHNSON,
L. C. TUFTS.